United States Patent [19]

Wrasman

[11] 4,176,689
[45] Dec. 4, 1979

[54] FLUID CONTROL VALVE WITH STEM SEAL

[76] Inventor: Thomas J. Wrasman, 11222 Bluegrass Pkwy., Louisville, Ky. 40299

[21] Appl. No.: 839,441

[22] Filed: Oct. 5, 1977

[51] Int. Cl.² .................... F16K 5/06; F16K 41/00
[52] U.S. Cl. ................... 137/797; 251/214; 251/288; 251/315; 264/242
[58] Field of Search ............... 251/214, 315, 330; 137/68 R, 797

[56] References Cited

U.S. PATENT DOCUMENTS

| | | | |
|---|---|---|---|
| 1,854,837 | 4/1932 | Hansen | 137/68 R X |
| 2,387,013 | 10/1945 | Fuller | 29/157.1 |
| 3,239,191 | 3/1966 | Widera | 251/315 X |
| 3,271,845 | 9/1966 | Breher | 29/157.1 |
| 3,486,736 | 12/1969 | Scaramucci | 251/315 |
| 3,635,439 | 1/1972 | McNally | 251/315 |
| 3,712,584 | 1/1973 | Wise et al. | 251/315 X |
| 3,712,587 | 1/1973 | Specht | 137/68 R X |
| 3,788,602 | 1/1974 | Kitzie | 251/312 |
| 3,961,770 | 6/1976 | Wrasman | 251/315 |
| 4,038,358 | 7/1977 | Wrasman | 251/315 X |

Primary Examiner—Martin P. Schwadron
Assistant Examiner—Richard Gerard
Attorney, Agent, or Firm—Fitch, Even & Tabin

[57] ABSTRACT

A plug or ball valve is disclosed having a housing and plug or ball in the housing for controlling the flow of fluid therethrough. A valve stem extends through the housing for rotation of the plug. The valve stem has a narrow peripheral shoulder which is held tightly against the housing by fluid pressure on the plug to prevent leakage past the seal when the valve is in a partially open position.

11 Claims, 5 Drawing Figures

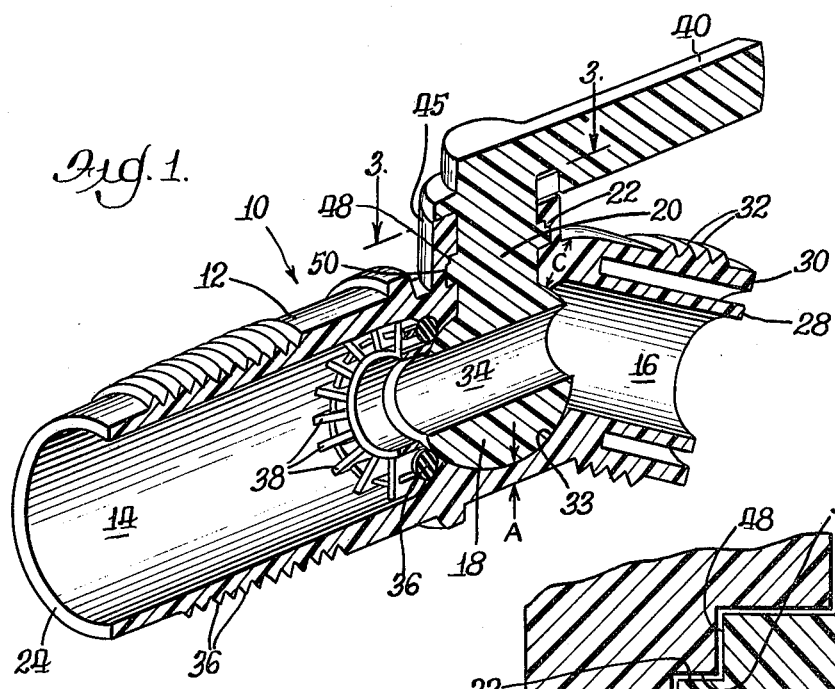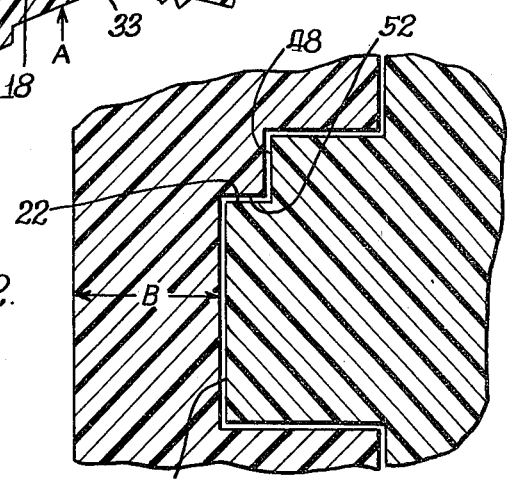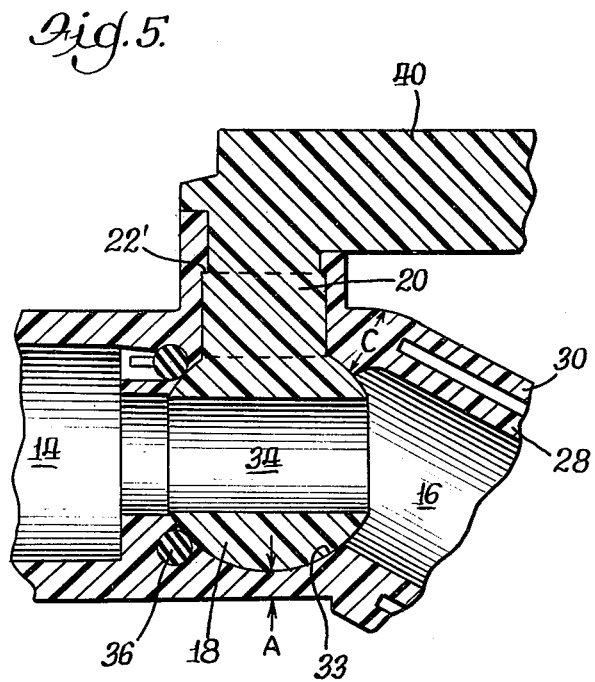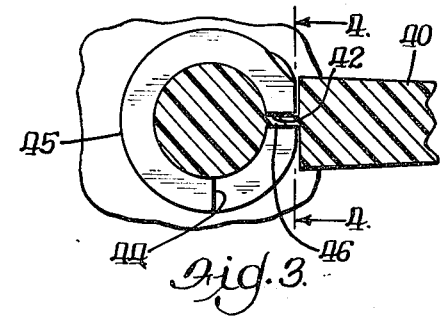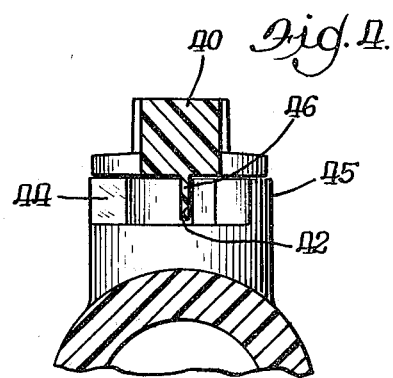

FLUID CONTROL VALVE WITH STEM SEAL

The present invention generally relates to fluid control valves and, more specifically, to ball valves which have stems for turning the plug between open and closed positions.

Plug or ball valves are widely used to control fluid flow. Ordinarily the valve includes a plug or ball which rotates in a cavity between the inlet and outlet. Flow is permitted when a passageway in the ball is aligned with the inlet and outlet.

Since the plug must be free to rotate, there is often at least a slight space provided between the plug and the chamber in which it rotates. In metallic valves, the proper rotational play may be provided by machining the chamber slightly larger than the plug. In molded plastic valves, shrinkage of the valve housing away from the plug may create a slight space between the plug and the chamber, so that the plug may be rotated. However, when the plug is in a partially open position, where the passageway in the plug only partially overlaps the walls of the cavity in which the plug rotates, fluid from the upstream side of the valve may be forced into the space between plug and the housing cavity. This fluid then migrates along the valve stem, which extends through the housing, and results in leakage from the valve. Past efforts to prevent leakage along valve stems have usually involved the use of O-rings, gaskets or packings around the stem. Of course, this necessitates additional materials and operations in the manufacturing process, and results in higher cost.

Accordingly, it is a general object of the present invention to provide a valve with a stem seal which does not suffer from the aforesaid deficiencies. More particularly, it is an object of the present invention to provide a valve with a stem seal which may be fabricated without the need for additional materials or manufacturing steps. It is a further object to provide such a valve which may be of molded plastic construction.

These and other objects of the present invention are disclosed in the following detailed description and accompanying drawings, of which, FIG. 1 is a perspective sectional view of a valve embodying various features of the present invention.

FIG. 2 is an enlarged sectional view of a portion of the valve stem of the valve in FIG. 1.

FIG. 3 is a horizontal sectional view taken along line 3—3 of FIG. 1.

FIG. 4 is a vertical sectional view taken along line 4—4 of FIG. 3.

FIG. 5 is a sectional view of a valve employing an alternative embodiment of the present invention.

The present invention is generally embodied in a valve 10 which has a valve body or housing 12 with an inlet 14 and outlet 16 and a rotatable plug or ball 18 for controlling flow between the inlet and outlet. A valve stem 20 is attached to the plug and extends through the housing for rotating the plug between open and closed positions. In accordance with the present invention, a narrow peripheral ledge or shoulder 22 is provided around the valve stem and sufficient play is provided between the plug and the housing so that when the plug is pushed upwardly, the valve stem shoulder engages the housing. When the valve is partially open, the leakage of upstream fluid around the plug causes a net upward force on the plug which forces the narrow shoulder tightly against the housing and seals the stem against leakage. In a molded plastic valve, the housing is preferably thicker around the plug than at the shoulder area of the stem. This is to take advantage of the phenomenon exhibited by many plastics in which cooling shrinkage is directly proportional to thickness. With such plastics, shrinkage of the housing during cooling is greater around the plug than at the shoulder, thereby automatically providing the desired spacing and amount of play.

Turning now to a more detailed description of the present invention, which is shown in the attached drawings in the preferred embodiments for purposes of illustration and not limitation, the valve 10 is preferrably of molded plastic construction. The valve body 12 is integral, being molded in one operation around the preformed plug 18 and stem 20 which are also of one-piece plastic construction. The plastic material preferably used in molding the housing is a glass fiber reinforced acetyl copolymer resin such as that available under the trademark Celcon, from the Celanese Plastics Co., but any plastic molded material which has sufficient strength and rigidity and the desired shrinkage characteristics will work. The valve body has an externally threaded barrel 24 which defines the inlet passageway of the valve and is in-line with the plug 18. The external threads 26 are for attaching the valve to the desired apparatus, e.g. a water heater.

The valve outlet 16 is downturned to direct the flow of liquid, like a faucet when the valve is open. The outlet 16 is of double barrel construction with an internal barrel 28 and an outer concentric barrel 30 spaced from the inner barrel. The space between the double barrels aids in cooling the valve after it is molded during the manufacturing process, and may also improve fluid flow through the valve. The outer barrel is threaded at 32 for attachment to a discharge line or the like.

As noted earlier, the housing 12 is molded around the plug 18. Thus, the cavity in which the plug rotates, generally defined by a surface 33, conforms to the shape of the plug. The plug and valve stem 20 are preformed, and are preferably of one-piece plastic construction. A phenylene oxide-based resin such as that available under the trademark Noryl from the General Electric Co. is the preferred material for the plug and stem but other plastics of sufficient strength may also be used. The plug portion 18 is preferably spherical or ball shaped, but it may also be oval, elliptical or defined by other surfaces of rotation, so as to take advantage of the features disclosed hereinafter. A horizontal cylindrical bore 34 is provided in the plug to permit fluid to flow through the valve when the plug is turned to align the bore with the inlet and outlet passageways 14 and 16.

When the valve is fully closed, the plug is sealed by an annular elastomeric seal 36 on the upstream side. During molding of the housing, this seal is held tightly against the plug by a tool which has an annular set of spaced fingers to hold the seal in place. During molding, plastic flows into the spaces between the fingers of the tool to form integral plastic retaining fingers 38 which hold the seal in place after molding is completed and the tool is removed. The details of this seal construction and a description of the tool and process used may be found in my copending applications for U.S. Letters Patent, Ser. No. 768,964, now U.S. Pat. No. 4,084,783 and Ser. No. 768,967 and my U.S. Pat. No. 4,038,358 entitled "Method of Making a Valve" which disclosures are hereby incorporated by reference into this application.

The valve stem 20 includes an integral handle 40 for rotating the plug between the open position, where the bore 34 is aligned with the inlet and outlet, and the closed position, where the bore openings are completely covered by the surface 33 of cavity in which the plug rotates. As best seen in FIGS. 3 and 4 the handle and stem may be turned in a 90° arc between stops 42 and 44 on the neck 45 of the housing, which correspond respectively to fully open and fully closed positions for the valve. The portion 46 of the valve handle which actually abuts the stops is preferably sufficiently thin so that it will break-away if the handle is turned against a stop with excessive force, but thick enough to provide a firm abutment against the stops at open and closed positions. If the thin handle portion 46 is broken away by excessive force, the valve is still fully operable, but there are simply no positive stops at the open and closed positions.

In accordance with the present invention, the stem 20 is sealed against leakage by the narrow shoulder 22 which circumscribes the stem. In the preferred embodiment, the shoulder 22 is defined between a pair of adjacent, radially extending rings 48 and 50 molded around the stem. The thin upper ring 48 is of a slightly smaller radius than the thick lower ring 50, thereby exposing a narrow peripheral edge portion of the top surface of the thick ring. This narrow edge portion is the shoulder 22. Since the two rings are adjacent and are, in fact, preferably integrally molded, they may be alternatively described as a single ring with a stepped upper edge to provide the annular shoulder 22.

The shoulder 22 is preferably flat, lying in a plane transverse to the axis of the stem and facing upwardly, away from the plug. The neck portion of the housing is molded around the stem and the rings and extends up to the handle 40. The inside surface of the neck portion includes a narrow ledge 52 which faces the shoulder 22 and is of approximately the same dimensions.

The stem 20 is sealed against leakage by direct sealing contact between the shoulder 22 and the ledge 52, caused by an upward force on the valve plug and stem arising from the actual fluid leaking therebetween. So that the shoulder will engage the ledge when upward force is applied to the plug and stem, the shoulder should be spaced from the ledge less than the plug and top of the upper ring 48 is spaced from the inside of the housing. In metallic valves, the appropriate spacing may be provided by precise machining. In the preferred plastic molded valve the desired tolerances may be automatically provided by shrinkage of the plastic housing during cooling. As noted earlier, with the preferred plastics, shrinkage during cooling is proportional to the thickness of the plastic, i.e., the greater the thickness of the plastic, the greater the shrinkage thereof during cooling. Since the plug and stem are constructed of plastic, which has lower thermal conductivity than the mold in which the housing is formed (usually metallic, e.g., steel or aluminum), the outer portion of the valve housing adjacent to the mold cools first. Inner portions of the valve walls more slowly shrink toward the outside surface, where the heat is quickly transferred to the mold, and away from the inner plug and stem. By selectively proportioning the thickness of the walls of the plastic housing, the appropriate tolerances and spacing between the plug and stem and housing may be automatically provided during cooling and shrinkage of the housing after molding.

In the preferred embodiment, as may be seen in FIGS. 1 and 2, the housing is substantially thicker, preferably at least about twice as thick, around the plug (as indicated by dimension A in FIGS. 1 & 5) than adjacent the shoulder 22 (as indicated by dimension B in FIG. 2). The housing walls around the plug may be made even thicker by molding external lugs (not shown) on the housing for attaching wrenches or the like. The lugs may be seen more clearly in my copending applications which are incorporated by reference into this specification. The housing around the plug is preferably even thicker adjacent to the upper portion of the plug (Indicated by dimension C in FIGS. 1 and 5) to provide a gap after cooling which permits sufficient upward movement of the plug and valve stem for the shoulder 22 and ledge 52 to abut. The neck portion 45 of the housing is also preferably about twice as thick above the thin upper ring 48 than adjacent to the shoulder, so that there is greater shrinkage, permitting slight upward shifting of the shoulder when force is applied. The neck portion which is adjacent to the shoulder also shrinks during cooling, but since it is thinner, it shrinks less, and there is a smaller gap between the ledge 52 and the shoulder 22 than between the housing and any other surface of the stem and plug where upward movement could be restrained.

When the plug is partially open, so that the entrance to the bore 34 partially overlaps the walls of the chamber, fluid under upstream pressure may leak into the slight gap between the plug and housing. It should also be understood that the valve may have fluid between the plug and housing when the plug is totally open and even when it is closed, if there is back pressure existing in the downstream piping in which the valve may be connected. However, if the valve outlet is open to atmosphere, then the potential for greatest leakage through the valve stem would occur when the valve is partially open. Without the present construction, this fluid would leak from the housing by migrating along the valve stem. However, with the present invention, the actual presence of the fluid is used to provide the net upward force that causes the shoulder 22 to tightly engage the facing ledge 52 of the housing to seal the stem against leakage of the fluid outside the housing. Using a force analysis to illustrate this effect, the fluid under pressure fills the narrow space between the plug and the housing and between the housing and that portion of the valve stem below the shoulder 22. The fluid between the lower hemisphere of the plug and the cavity exerts an upward force on the plug and stem. The fluid between the upper hemisphere of the plug and the housing exerts a downward force. However, because the valve stem eliminates a significant portion of the surface area in the upper hemisphere and further because upward fluid pressure on the underside of the ring 50 offsets an equivalent amount of downward pressure on the upper hemispherical surface of the plug, the upward forces on the plug and stem are substantially greater than the downward forces. Since the space between the housing and the shoulder 22 is less than the space between the housing and remainder of the plug and stem, a net upward force causes the shoulder to engage the facing ledge 52 of the housing neck. Although the net upward force may be relatively small, the shoulder 22 is preferably sufficiently narrow so that the upward force is applied over a small area, thereby producing a relatively high pressure between the shoulder 22 and the facing ledge 52. On the other hand, the shoulder should also be sufficiently wide to provide a firm engagement with the ledge 52. The width of the shoulder depends upon the overall size of the valve that is produced. In a smaller valve of a size such as would be used on ¾" water piping, a width of about 0.01 inch is effective. With a ledge of this width in a valve of this size, there is approximately a 12 to 1 ratio of the net surface area of the ball and stem which causes an upward force relative to the surface area of the shoulder 22. It is this tight shoulder to ledge engagement which seals the stem against the leakage.

An alternative embodiment of the present invention is illustrated in FIG. 5. There, the peripheral shoulder 22' is provided by a reduction in diameter of the valve stem. A seal with this arrangement does not have the advantage of a compensating upward force which was provided by fluid pressure on the underside of the ring 50 in the preferred embodiment, and therefore, there is less upward force on the plug and stem. The preferred embodiment has one further advantage, and that is that the neck 45 of the housing is thicker when it is molded around the radial rings 48 and 50, and stops 42 and 44 at the fully opened and fully closed position may be easily molded on the neck. In the alternative embodiment, the housing neck 45' molded around the stem may not be thick enough to provide rigid stops against which the handle may abut.

Therefore, it may be seen that with the present and ingenious invention a valve which has a stem seal may be easily and quickly fabricated without the need for any additional separate materials, steps or processes. The net upward force of fluid leaking between the plug and housing actually provides the force for causing the stem shoulder to seal tightly against the housing.

Although preferred embodiments of the present invention have been illustrated and described, various modifications, alternatives and equivalents thereof will become apparent to those skilled in the art. Accordingly, the scope of the present invention should be defined by the appended claims and equivalents thereof.

Various features of the invention are set forth in the following claims.

What is claimed is:

1. A fluid control valve comprising housing means having walls defining an inlet, an outlet and a chamber communicating therebetween, a valve plug disposed within said chamber for regulating the flow of fluid between the inlet and outlet, said valve plug having a passageway therethrough, a valve stem rigidly attached to said valve plug and extending through said housing means for exteriorly rotating said valve plug between an open position in which said passageway flowably communicates with the inlet and outlet and a closed position in which said valve plug blocks any flow between the inlet and outlet, said valve plug being spaced from the adjacent wall of said chamber and having an effective fluid pressure responsive surface providing a net upward force in the direction of said valve stem whenever fluid is present between plug and adjacent housing, said valve stem including a peripheral shoulder interior of said housing means and spaced from said housing means less than said valve plug is spaced from the adjacent wall of said chamber, said net upward force causing said shoulder to tightly engage said housing means, preventing leakage along said valve stem.

2. A valve in accordance with claim 1 in which said shoulder is in a plane generally transverse to the axis of said stem and is located between a pair of concentric cylindrical surfaces.

3. A valve in accordance with claim 1 in which said housing means is plastic, integrally molded about a one-piece plastic plug and stem, said housing being thicker adjacent said plug and stem than adjacent said shoulder.

4. A valve in accordance with claim 3 in which said one-piece valve plug and stem includes a handle exterior of said housing for rotating said valve plug, said housing including stops corresponding to open and closed position for said valve plug, said handle including a breakaway portion to abut said stops to restrict movement of said handle between open and closed positions, said breakaway portion having lower strength than the said stem or said handle to protect said stem and handle against excessive force applied when turning said handle against stop.

5. A valve in accordance with claim 1 in which the surface area of the chamber closely adjacent the hemispherical surface of said valve plug opposite said valve stem is greater than the surface area of said chamber which is closely adjacent the other hemisphere of said valve plug.

6. A valve in accordance with claim 1 which includes an elastomeric O-ring secured in sealing engagement against said housing and said valve plug on the upstream side thereof, said O-ring circumscribing the upstream end of said passageway when said valve is fully open and completely sealing said valve plug when it is fully closed.

7. A fluid control valve comprising:
an integrally molded plastic housing having walls defining an inlet, an outlet and a chamber communicating therebetween;
a plastic ball disposed within and slightly spaced from the adjacent walls of said chamber, said ball regulating the flow of fluid between the inlet and outlet, said valve ball having a passageway therethrough;
a plastic valve stem integrally attached to said ball and extending through said housing means for rotating said ball between an open position where said passageway flowably communicates with the inlet and outlet and a closed position in which said valve ball blocks flow;
said valve stem having a narrow peripheral shoulder interior of said housing and facing away from said valve ball, said housing being molded with a greater thickness adjacent said valve ball than adjacent said peripheral shoulder so that the spacing is less between the shoulder and the housing than between the ball and the chamber wall, and the surface area of said chamber adjacent the hemispherical surface of said valve ball opposite said valve stem being greater than the surface area of said chamber adjacent the other hemisphere, so that there is a net upward force produced by fluid pressure existing in the space between the ball and the adjacent wall of the chamber, said net upward force urging said shoulder into tight engagement with said housing for the purpose of preventing leakage of fluid along said valve stem beyond said shoulder.

8. A valve in accordance with claim 7 in which said shoulder is a narrow annular surface concentric with the axis of said stem and in a plane transverse thereto.

9. A valve in accordance with claim 7 in which said valve stem includes a handle exterior of said housing, said housing including a pair of stops to abut said valve at fully open and fully closed positions, a breakaway portion on said handle to abut said stops, said breakaway portion being weaker than said handle and stem to yield to said stop when excessive turning force is applied to said handle.

10. A fluid control valve in accordance with claim 7 in which an elastomeric O-ring is sealing engagement against housing and said valve ball on the upstream side thereof, said O-ring circumscribing the upstream end of said passageway when said valve ball is in the substantially fully open position and completely sealing said valve ball when it is fully closed.

11. A fluid control valve comprising:
- an integrally molded plastic housing having walls defining an inlet, an outlet and a generally spherically shaped chamber communicating between the inlet and the outlet;
- a plastic ball disposed within the chamber and sized to provide a slight spacing between the ball and the adjacent wall of the spherical chamber, the plastic ball having a passageway therethrough for communicating fluid between the inlet and the outlet, said ball being rotatable within the chamber to open and close the valve;
- a cylindrical plastic valve stem integrally formed with the ball, said stem extending through an opening of the housing and having associated handle means attached thereto for rotating the stem and the ball to open and close the valve;
- said stem having a narrow annular surface that is in a plane generally perpendicular to the axis of the cylindrical stem, said annular surface being defined by a reduced diameter portion away from the ball, said annular surface engaging a cooperative annular surface of said housing, the total surface area of said ball upon which fluid pressure acts being less on the side of said ball having said stem integrally formed therewith than on the opposite side thereof so that fluid pressure provides a net force acting in the direction toward said stem to thereby urge said annular surfaces of said stem and housing together and provide a tight engagement for sealing the valve stem to prevent fluid flow beyond said annular surfaces and prevent leakage of fluid out of the opening of said housing through which said stem protrudes.

* * * * *